April 9, 1957 R. DEMING 2,788,484
TIRE INSPECTION DEVICE
Filed July 31, 1953 4 Sheets-Sheet 1
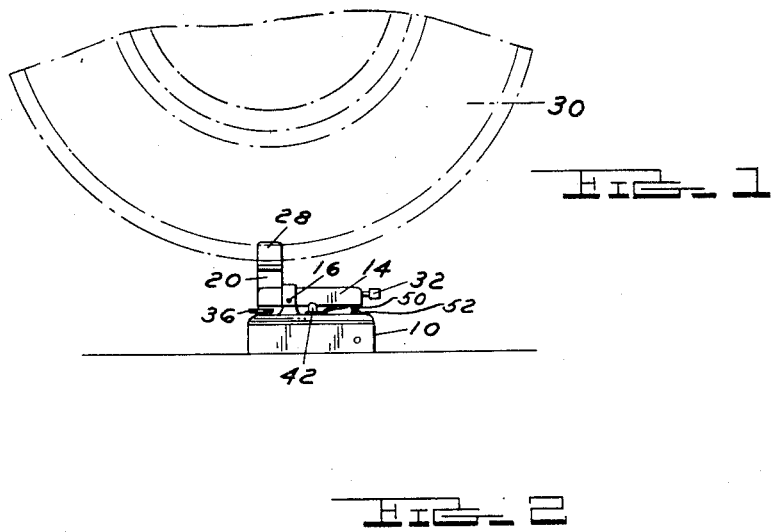
Fig. 1
Fig. 2
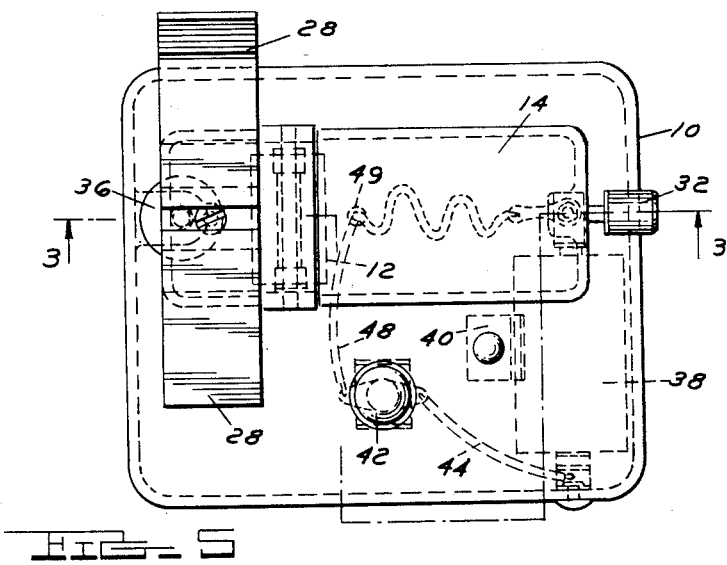
Fig. 3
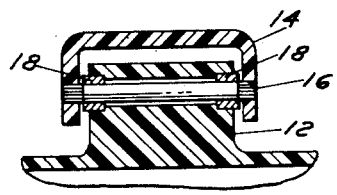
INVENTOR.
ROY DEMING
BY
Burton & Parker
ATTORNEYS

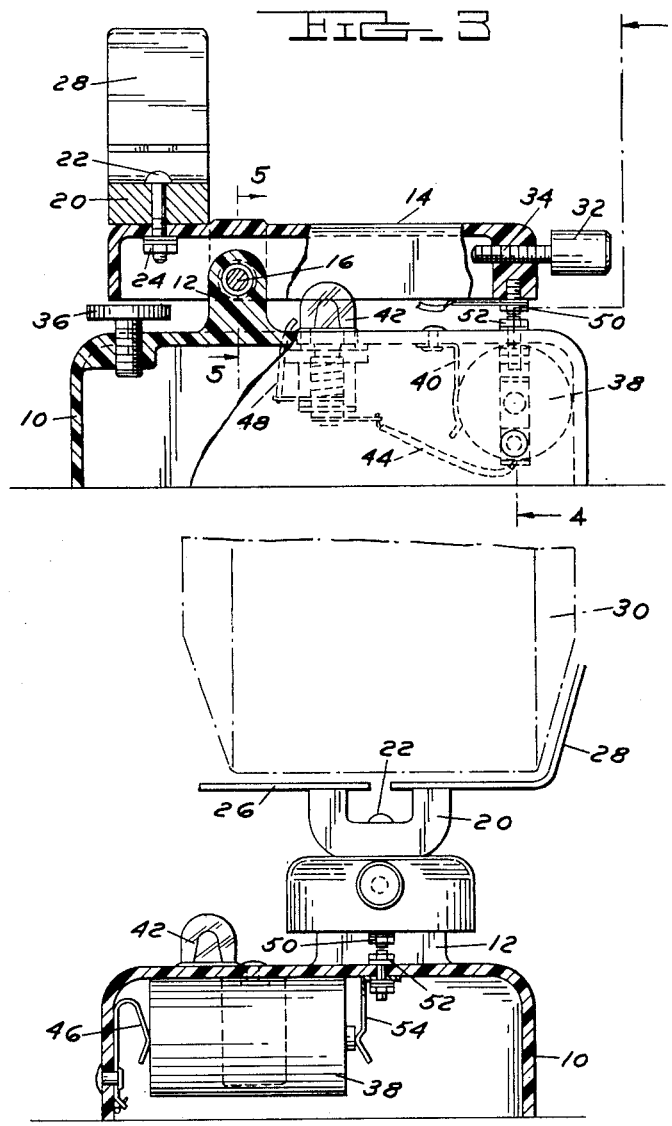

April 9, 1957
R. DEMING
2,788,484
TIRE INSPECTION DEVICE
Filed July 31, 1953
4 Sheets-Sheet 3
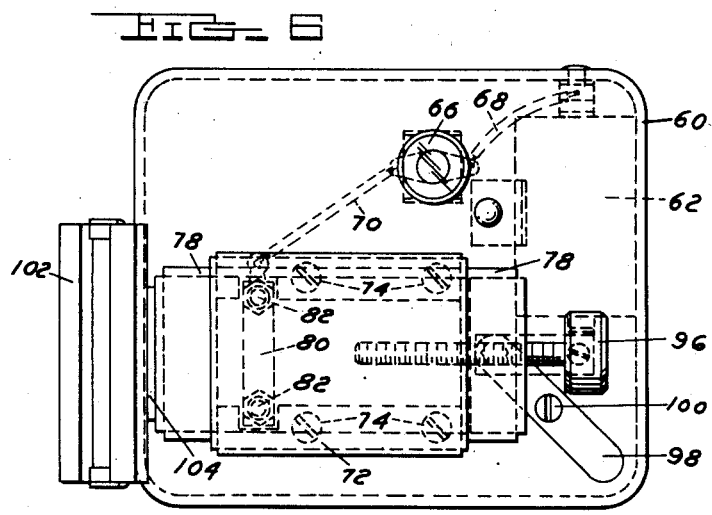
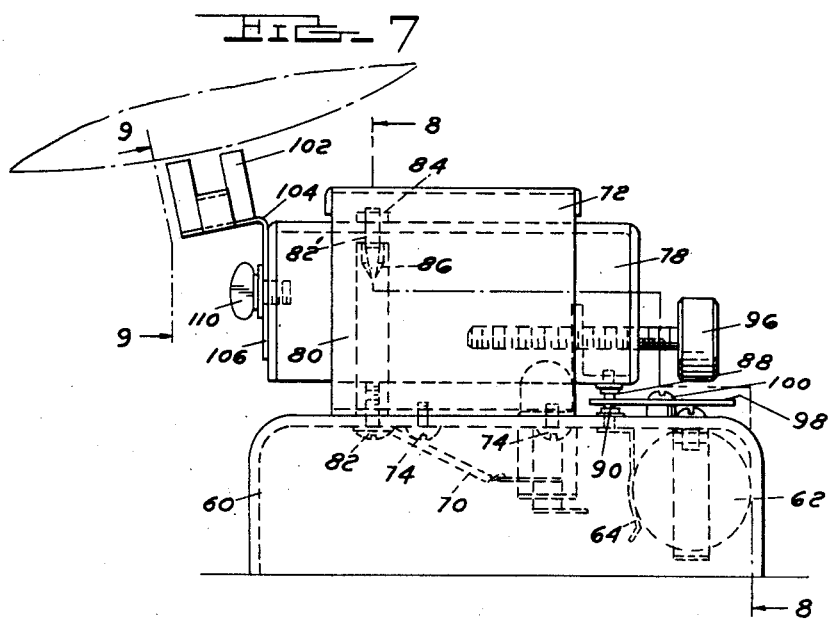
INVENTOR.
ROY DEMING
BY
Burton & Parker
ATTORNEYS April 9, 1957
R. DEMING
2,788,484
TIRE INSPECTION DEVICE
Filed July 31, 1953
4 Sheets-Sheet 4
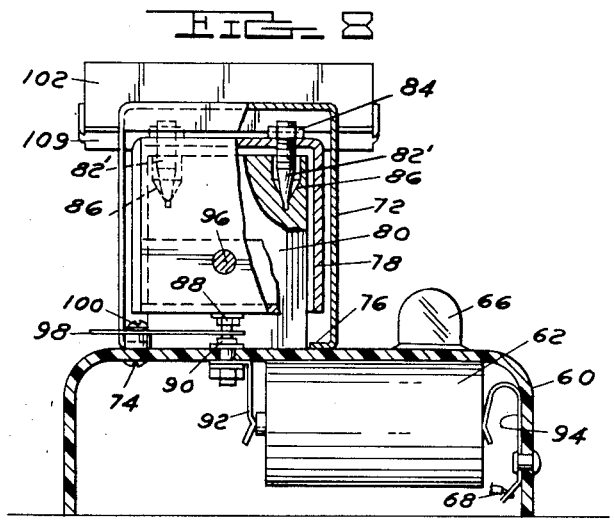
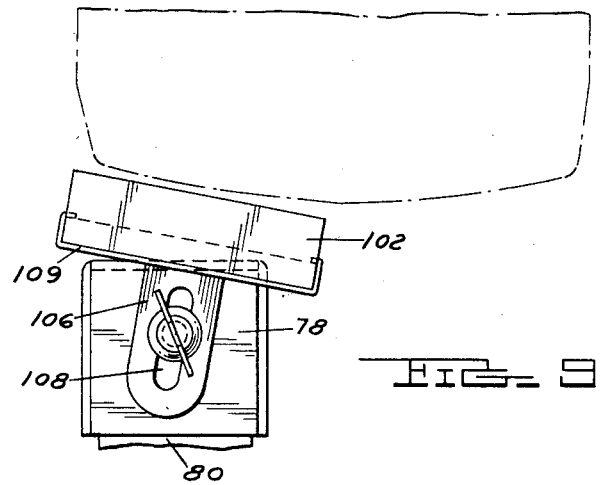
INVENTOR.
ROY DEMING
BY
Burton & Parker
ATTORNEYS

United States Patent Office 2,788,484
Patented Apr. 9, 1957

2,788,484

TIRE INSPECTION DEVICE

Roy Deming, Jackson, Mich., assignor to Kent-Moore Organization, Inc., Detroit, Mich., a corporation of Michigan Application July 31, 1953, Serial No. 371,662

1 Claim. (Cl. 324—41)

This invention relates to a tire inspection device.

An object is to provide a tire inspection device which is simple, inexpensive and easily shiftable from one place to another whereby the tire of a motor vehicle may be examined to learn if it contains embedded nails, tacks or other sharp pieces of magnetically attractable metal which might work their way therein to the disadvantage of the tire.

More specifically, an object is to provide a magnetic nail finder of the character set forth which is adapted to be used to locate nails or other magnetic particles embedded in automobile tires.

This magnetic nail finder is of simple construction and small size and may be readily transported from one place to another so that an automobile tire may be rotated thereover and the device is sufficiently sensitive in its response so that it will indicate the location of magnetic particles which might be embedded in the tire as the tread of the tire is passed over the device.

A further object is the provision of a device of the character set forth which includes a magnetically responsive assembly so pivotally balanced that as the tread surface of an anutomobile tire is revolved over the magnetically responsive balanced portion of the device it will swing toward any magnetically attractable material embedded in the tire and such swinging movement will energize an indicator signal so that magnetic material embedded in the tire will be quickly located.

When the tires of a motor vehicle are to be inspected the vehicle may be elevated above the floor and the device brought into proximity to the tread surface of one tire after another and the tire being examined can be revolved over the device. On the other hand, the vehicle may remain on the floor and one wheel after the other may be jacked up and revolved in proximity to the device.

Other objects, advantages and meritorious features will more fully appear from the following description, appended claim and accompanying drawings, wherein, Fig. 1 illustrates a side elevation of the device disposed on the floor with a tire suspended thereabove for rotation thereover;

Fig. 2 is a plan of the device shown in Fig. 1;

Fig. 3 is a vertical sectional view taken on the line 3—3 of Fig. 2;

Fig. 4 is a vertical sectional view taken on the line 4—4 of Fig. 3 and showing a portion of the tire in dotted outline in responsive position to the magnetic portion of the device; and Fig. 5 is a fragmentary vertical sectional view taken on the line 5—5 of Fig. 3;

Fig. 6 is a plan of a modification of the invention;

Fig. 7 is a side elevation of the structure shown in Fig. 6;

Fig. 8 is a vertical sectional view taken on the line 8—8 of Fig. 7; and

Fig. 9 is a fragmentary cross section taken on the line 9—9 of Fig. 7.

This magnetic nail finder or tire inspection device is based upon the employment of a magnetically responsive pivotally balanced element which can be readily supported in close proximity to the tread surface of an automobile tire so that the tire may be revolved to the element. If a magnetically attractable piece of material is brought into sufficiently close proximity to the magnetically responsive element it is so balanced that it will swing relative to the material and this swinging movement will energize an indicating signal that will reveal the presence of the magnetic particle though embedded within the tire. The device is embodied in a relatively small design and comprises a base 10 which may be formed of plastic or other suitable insulating material. The top of the base is provided with an upwardly projecting stub or fulcrum 12. A magnetic assembly is pivotally supported upon this fulcrum 12. This assembly comprises an arm 14 which is shown as formed of material such as the base and which is illustrated as channel-shaped. A pivot pin 16 extends through the two side walls of the arm as shown in Fig. 5 and is journaled in bearings 18 mounted in the stub 12 as shown in Fig. 5.

Mounted upon one end of the arm is a magnet 20. This magnet is pivotally mounted upon the arm by being coupled thereto by means of a pin 22 so that the magnet may be rotated as hereinafter described with respect to the arm. The pin 22 extends through the arm 14 and is held thereon by a nut 24. The magnet has two pole extensions 26 and 28. 26 is a flat extension but 28 is an angular extension. Combined the two extensions conform in part to the curvature of the tread surface of an automobile tire such as indicated in dotted outline at 30 in Fig. 4. The arm 14 is provided at the opposite end with a weight 32 mounted upon a threaded pin 34 which pin is theraded into the end of the arm so that the weight may be moved toward or away from the arm to thereby adjust the balance of the arm upon its pivot pin 16. The weight 32 counterbalances the weight of the magnet 20.

The extent of swing of the arm may be controlled by adjustment of a threaded stop pin 36 shown particularly in Fig. 3. This stop pin has a threaded shank which is threaded into the base 10 so that the head of the pin may be raised or lowered by threaded adjustment and will thereby serve to determine the swinging movement of the arm.

Mounted within the hollow boxlike base is a dry cell battery 38. This battery 38 may be held removably in place by a clamp 40. An electric signal light 42 is supported upon the base as shown in the various figures of the drawing. This signal light is connected in a circuit with the battery by a lead 44 which extends to a contact 46 that engages one terminal of the battery as shown in Figs. 2 and 4. Another lead 48 extends upwardly through the base and is connected at 49 with the arm 14 and extends from such point 49 to a contact 50 mounted on the underside of the arm 14. A second contact 52 is mounted on the top of the base directly below the contact 50 and this contact 52 is connected with the opposite terminal of the battery through a lead and contact element 54 as shown in Fig. 4.

The magnetic assembly embodied in the arm 14 and the magnet is so pivotally balanced on the base that the contact members 50 and 52 are normally spaced apart but the balance is so sensitive that there may be intermittent engagement between the contacts if the device is disturbed. The balance is finely adjusted. When it is desired to test a tire the device is disposed so that the magnetic face portion of the magnet between pole extensions 26 and 28 will be disposed with respect to a tire in the manner shown in Fig. 4. The tire may then be rotated and with the tire in such close proximity to the magnet the magnet will swing toward any magnetically attractable material carried by the tire. The swinging of the magnet toward the tire will cause the contacts 50 and 52 to come into engagement and the light 42 will be lit indicating the presence of magnetically attractable particles. The tire may be rotated disposed as it is shown in Fig. 4. The magnet may then be revolved upon its supporting pin 22 so as to bring the angular polar extension in proximity to the opposite side surface of the tread and the tire again rotated to inspect such opposite side surface.

The modification shown in the last four figures of the drawings is generally similar to the construction heretofore described. There is a plastic casing 60 of the same general construction. A dry cell battery 62 is supported therein by a spring clamp 64 as shown in Fig. 6. A signal light 66 is mounted on the casing and a lead 68 extends from one terminal of the battery to the light. An electric connection 70 extends from the light as shown in Fig. 6 to a metal frame member 80 by way of a screw 82. Four such screws 74 are shown as securing the base flanges 76 of the bracket to the casing. This bracket encloses the swingable magnetic assembly.

The swingable magnetic assembly comprises an arm 78 which is shown in Fig. 6 as being channel-shaped in cross section. This arm surmounts a frame member 80 which frame member is secured upon the casing by a pair of screws 82 as shown in Figs. 6 and 7. The arm surmounts this frame member as shown particularly in Fig. 8 hanging down thereabout.

The arm is pivotally supported upon the frame member for very delicate swinging movement. The weight of the arm is taken on two tapered pointed pins 82' which are threaded and secured to the arm by nuts 84. These tapered pins depend within the arm and the points of these pins are seated within pin receiving sockets 86 formed in the frame as shown in Fig. 8. Since the entire weight of the arm is supported on these two very sharp points it swings very freely. No extra contact wire is required because the circuit is established through the frame, the points and the arm to the electrical contact 88 which is carried by the arm as shown in Fig. 7 and which contact is adapted as hereinafter described to establish a circuit through contact 90 which contact 90 is connected with one terminal of the battery by spring contact 92. The other terminal of the battery is engaged by spring contact 94 with the lead 68 as hereinabove described.

An adjustable weighted screw 96 is coupled with the arm for adjustment to regulate the balance thereof and functions in the same way as the adjustable weight 32 used in the structure shown in the first five figures of the drawing.

In order to prevent draining of the battery during the time that the device is not in use an insulating fiber plate 98 is pivoted upon a screw 100 so as to be swung either between the contacts 80 and 90 to prevent the circuit being made therethrough or to be swung out of position between said contacts to permit the establishment of a circuit therethrough. This fiber disk is normally kept in position between the contacts as shown in Fig. 7 when the device is not in use. When it is to be used the disk is swung out of position.

A magnet mounted upon the arm is somewhat different from that shown in the first five figures of the drawing. Such magnet is indicated by the numeral 102. It is carried by a bracket 104. This bracket has an extension 106 which is slotted as at 108. An adjustment screw 110 extends through the slot and by loosening the screw the magnet may be swung to different angular positions. It may be swung from the position shown in Fig. 9 where it is illustrated as disposed in opposition to one side of the tread surface of the tire to a second angular position in which it would be positioned opposed to the other side of the tread surface of the tire. With this magnet one side only of the tread surface of the tire would be touched at one time.

It will be seen that with this method of pivotally supporting the magnetic assembly the pivotal support is relatively high with respect to the magnet. The weight of the magnetic assembly hangs below this pivotal support. The magnetic assembly is more stable than the one shown in the first five figures of the drawing while at the same time it is extremely sensitive to magnetically attractable particles that may be embedded in the tire.

What I claim is:

In a tire inspection device having an electric signal, a base, a pivotal support of electrically conductive material mounted on the base, an arm of electrically conductive material pivotally mounted upon the support, a magnetic face member adjustably pivotally mounted on one end of the arm for pivotal adjustment to two relatively angular positions and having a face adapted to be opposed to the tread surface of the tire, said pivotal support including two pointed pins bearing upon tapered sides providing a delicate fulcrum for the arm whereby the arm responds in swingable movement to magnetically attractable material brought into proximity to said magnetic face member, and an electric circuit connected to the signal and to the pivotal support and including an electric contact mounted on the base and adapted to be engaged by the arm upon swingable movement thereof to make and break the electric circuit, and a part adapted to be shifted into and out of position between the arm and the electric contact to render the same ineffective to make the circuit.

References Cited in the file of this patent
UNITED STATES PATENTS

| | | |
|---|---|---|
| 1,746,627 | Babbitt | Feb. 11, 1930 |
| 1,778,655 | Wyman | Oct. 14, 1930 |
| 1,959,115 | Taylor et al. | May 15, 1934 |
| 1,992,214 | Katz | Feb. 26, 1935 |
| 2,579,404 | Stevenson | Dec. 18, 1951 |
| 2,600,857 | De La Mater | June 17, 1952 |
| 2,670,457 | Hartman et al. | Feb. 23, 1954 |
| 2,738,460 | Gross | Mar. 13, 1956 |